(12) United States Patent
Belknap et al.

(10) Patent No.: US 7,249,264 B2
(45) Date of Patent: Jul. 24, 2007

(54) SECURE IP BASED STREAMING IN A FORMAT INDEPENDENT MANNER

(75) Inventors: William R. Belknap, San Jose, CA (US); Glenn E. Brew, Boca Raton, FL (US); Jeffrey B. Lotspiech, San Jose, CA (US); Stefan Nusser, Los Altos, CA (US); Peter Westerink, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 791 days.

(21) Appl. No.: 10/114,140

(22) Filed: Apr. 2, 2002

(65) Prior Publication Data

US 2003/0188152 A1 Oct. 2, 2003

(51) Int. Cl.
*G06F 21/00* (2006.01)
*H04L 29/00* (2006.01)
(52) U.S. Cl. ...................... 713/189; 713/165
(58) Field of Classification Search ............ None
See application file for complete search history.

(56) References Cited

U.S. PATENT DOCUMENTS

| | | | |
|---|---|---|---|
| 6,098,056 A | 8/2000 | Rusnak et al. | |
| 6,134,243 A * | 10/2000 | Jones et al. | 370/465 |
| 6,138,119 A | 10/2000 | Hall et al. | |
| 6,263,435 B1 | 7/2001 | Dondeti et al. | |
| 6,490,354 B2 * | 12/2002 | Venkatesan et al. | 380/43 |
| 2002/0184488 A1 | 12/2002 | Amini et al. | |

FOREIGN PATENT DOCUMENTS

| | | |
|---|---|---|
| JP | 2002-057662 | 2/2002 |
| JP | 2002-063147 | 2/2002 |
| WO | WO99/37057 | 7/1999 |
| WO | WO00/27087 | 5/2000 |

OTHER PUBLICATIONS

U.S. Appl. No. 09/770,877, filed Jan. 26, 2001, Lotspiech et al.

(Continued)

*Primary Examiner*—Gilberto Barron, Jr.
*Assistant Examiner*—Kristin D. Sandoval
(74) *Attorney, Agent, or Firm*—Andre Gibbs; Jon A. Gibbons; Fleit Kain Gibbons Gutman Bongini & Bianco P.L.

(57) ABSTRACT

A system, method and computer readable medium for providing secure IP-based streaming in a format independent manner is disclosed. The method on a content mastering system begins with an encoded media file consisting of content data and associated metadata. First, the metadata is read from the encoded media file. Next, the encoded media file including the content data and the associated metadata is encrypted. Then, in a streaming server system, the encoded/encrypted media file is divided into more than one data packet, streamed in accordance with one or more parameters in the metadata. Each data packet includes a portion of the encoded/encrypted media file and an offset value corresponding to a location within the encoded/encrypted media file. The data packets are then streamed to a client information processing system (i.e., the client) over a network.

20 Claims, 7 Drawing Sheets

OTHER PUBLICATIONS

U.S. Appl. No. 10/042,652, filed Jan. 8, 2002, Lotspiech et al.

Flat, A., et al., "Broadcast Encryption," pp. 1-13, submitted to IEEE Trans. on Information Theory.

Canetti, R., et al., "Efficient Communication-Storage Tradeoffs for Multicast Encryption," pp. 456-470.

Canetti, R., et al., "Multicast Security: A Taxonomy and Some Efficient Constructions," pp. 1-9.

McGrew, D.A., et al., "Key Establishment in Large Dynamic Groups Using One-Way Function Trees," pp. 1-13, May 20, 1998.

Wong, C.K., et al., "Secure Group Communications Using Key Graphs," pp. 1-12, Proceedings of ACM SIGCOMM '98, Sep. 2-4, 1998, Vancouver, Canada.

Venkatramant, C., et al., "Securing Media for Adaptive Streaming," Proceedings of ACM Multimedia 2003, pp. 307-310, ISMA Security Standard, Aug. 2001.

\* cited by examiner

PRIOR ART

SECURE IP BASED STREAMING IN A FORMAT INDEPENDENT MANNER

BACKGROUND OF THE INVENTION

1. Field of the Invention

This invention generally relates to the field of streaming and more specifically to secure IP-based streaming.

2. Description of Related Art

As the use of the Internet has increased over recent years, so has the exchange of information and ideas. File sharing, in particular, has enjoyed increasing popularity. Initially, file sharing was implemented using FTP and gopher. Then, as the use of TCP/IP and the Web increased, users turned to downloading files using web browsers. Today, the use of streaming has gained prevalence as it allows a user to simultaneously download and experience a media file at the same time. However, the growth of the Internet has posed some interesting obstacles in the field of access control of protected content. As users increasingly send and receive files quickly and in great quantities, access control can take a back seat to the free flow of information. This created a need for secure streaming of protected content. Secure streaming, however, comes with drawbacks.

Figure 1:
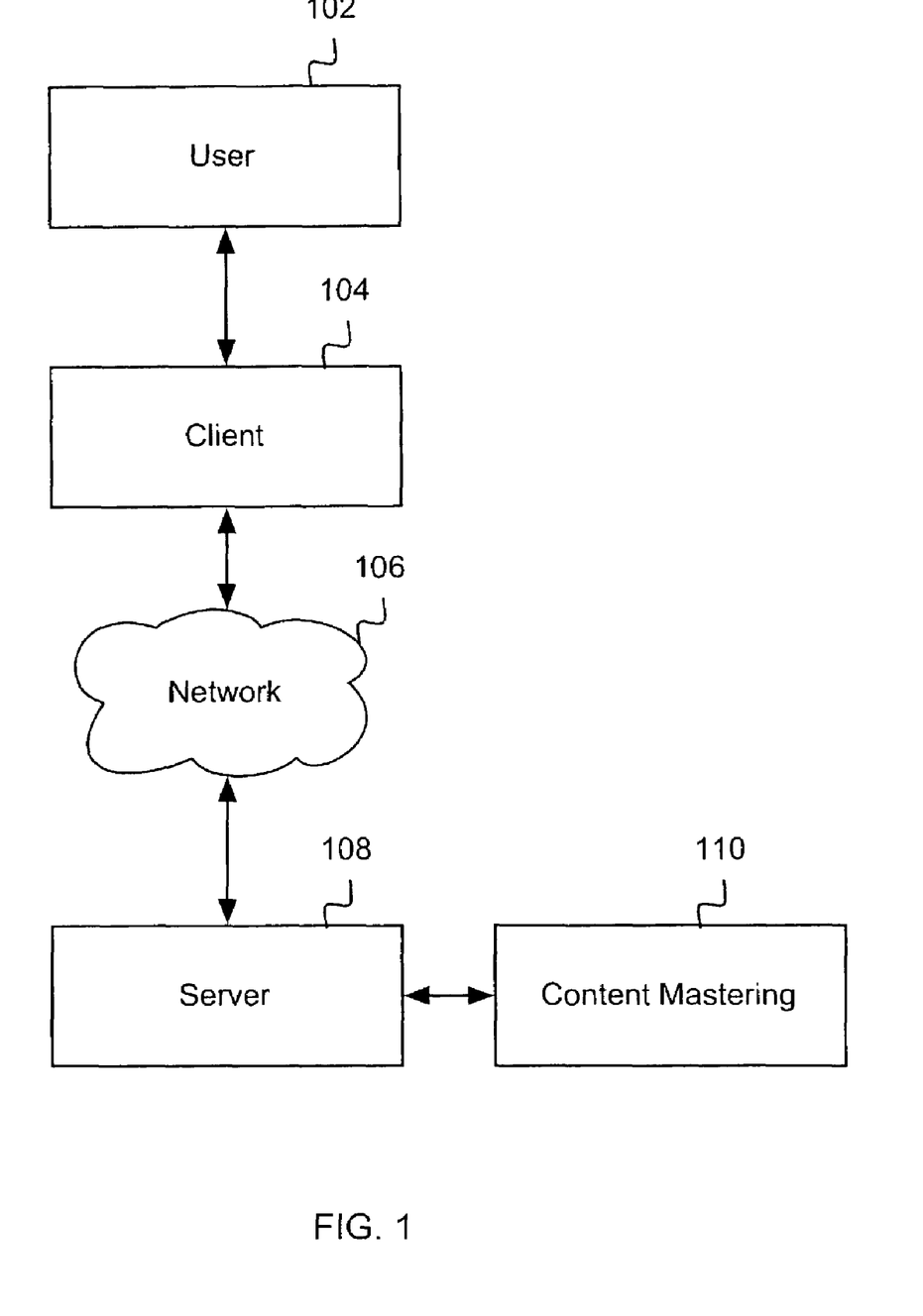
FIG. 1 is a block diagram illustrating the overall system architecture of a typical prior art system for secure streaming.

FIG. 1 is a block diagram illustrating the overall system architecture of a typical prior art system for secure streaming. A streaming server computer system 108 provides media files, such as MPEG 2 video files, for streaming to clients. A content mastering system 110 encompasses the functions of a system for creating, authoring and providing media files to the streaming server 108. Server 108 streams the provided media files over a network 106, such as the Internet. A user 102 utilizes a client computer system 104 (such as a home personal computer) to receive the streaming media files from server 108 via network 106. The computer systems of client 104, server 108, content mastering system 110, as well as the network 106, are described in greater detail below.

Figure 2:
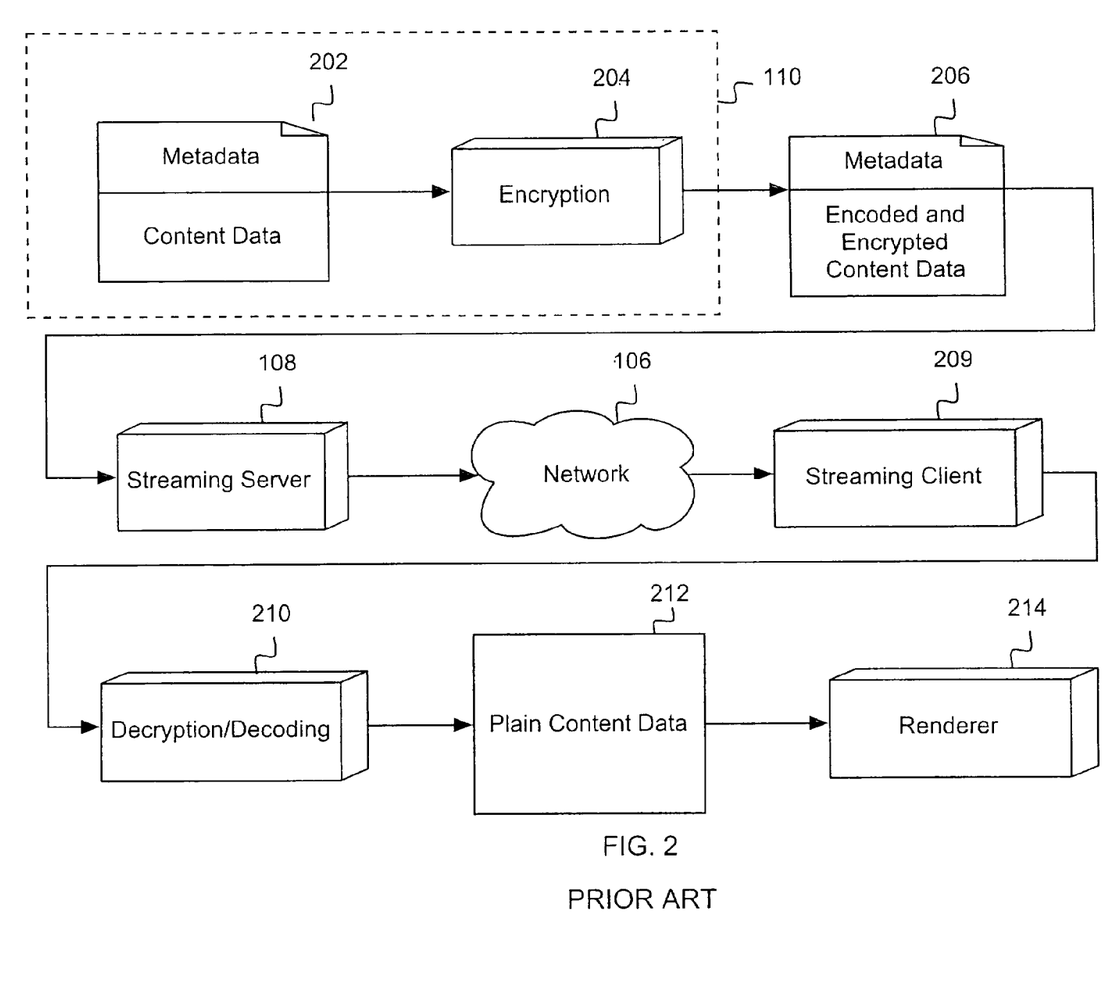
FIG. 2 is a functional diagram illustrating the overall process of a prior art system for secure streaming.

A well-known approach to the problem of secure streaming is described in FIG. 2. FIG. 2 is a functional diagram illustrating the overall process of a prior art system for secure streaming. FIG. 2 shows an encoded (i.e., compressed), media file 202 comprising an encoded content data portion and an associated plain metadata portion. Media file 202 is an MPEG 2 video file, a Windows Media Player video file, a QuickTime video file, an MP3 audio file or any other encoded media file that may be streamed. On the content mastering system 110 (see FIG. 1), an encryption module 204 reads the media file 202. The product of module 204 is media file 206 containing plain metadata and encoded/encrypted content data.

Subsequently, streaming server 108 reads media file 206. Streaming server 108 is the Windows Media Streaming Server, the QuickTime Streaming Server, the Darwin Streaming Server or any other server capable of streaming media files over a network. Streaming server 108 divides media file 206 into a finite number of data packets, which are then streamed to client 104 over network 106. On client 104, a streaming client 209 receives the data packets. Then, decryption/decoding module 210 processes the data packets. The product of module 210 is a media file 212 containing plain content data. Media file 212 is then provided to renderer 214, which plays or reads the media file 212.

Figure 3:
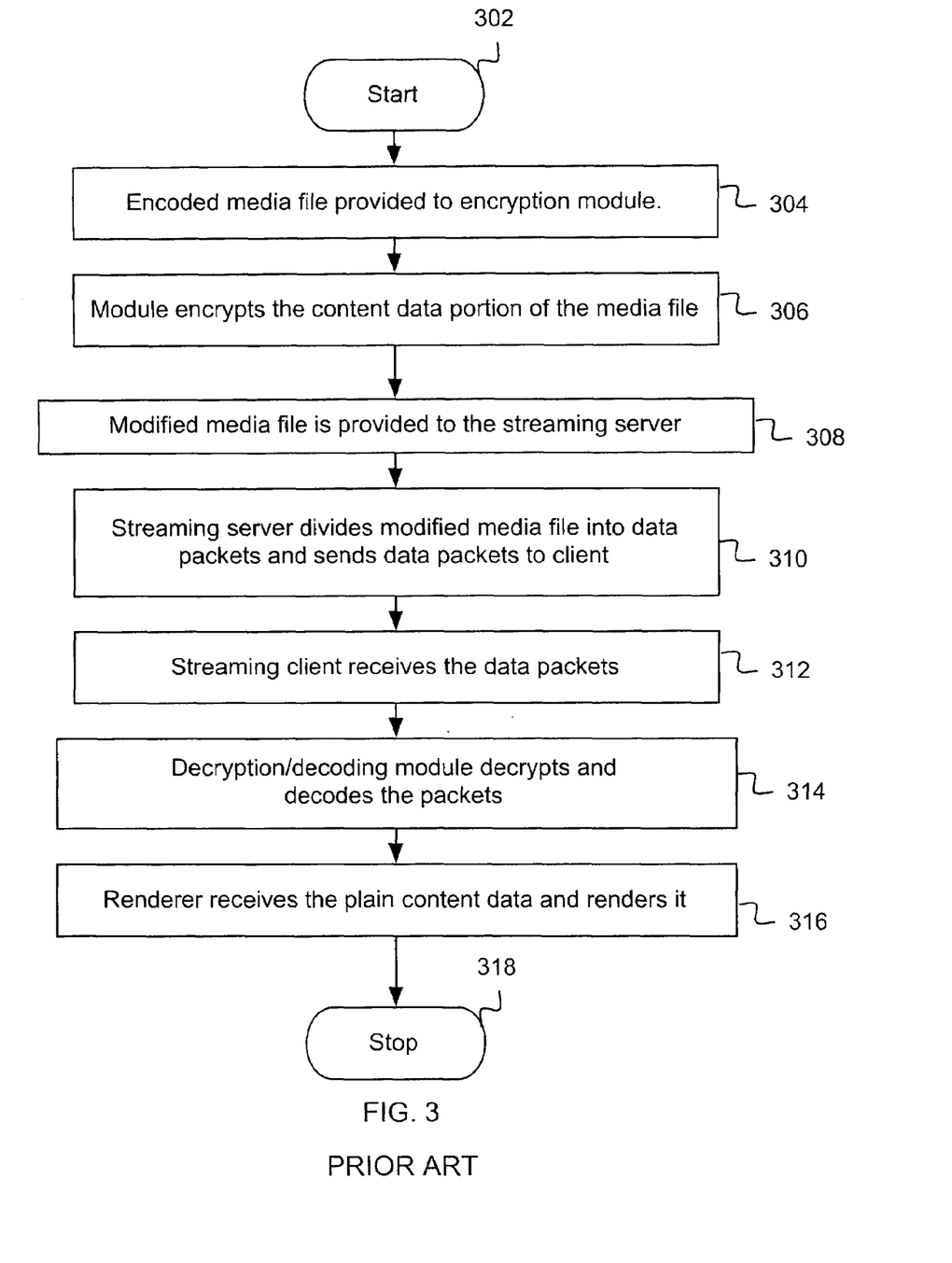
FIG. 3 is a flowchart depicting the operation and control flow of the overall process of the prior art system of FIG. 2.

FIG. 3 is a flowchart depicting the operation and control flow of the overall process of the prior art system of FIG. 2. On the content mastering system 110 (see FIG. 1), the control flow of FIG. 3 begins with step 302 and flows directly to step 304. In step 304, the encoded media file 202 (see FIG. 2) comprising an encoded content data portion and an associated plain metadata portion is provided to the encryption module 204. In step 306, module 204 encrypts the content data portion of media file 202. Consequently, media file 206 containing plain metadata and encoded/encrypted content data is produced. In step 308, the media file 206 is provided to streaming server 108. In step 310, the streaming server 108 divides the media file 206 into a finite number of data packets and streams the data packets to client 104 via network 106. In step 310, the streaming server 108 also sets streaming parameters in accordance with the metadata in encoded/encrypted media file 206

On the client 104, in step 312, the streaming client 209 receives the data packets via network 106. In step 314, decryption/decoding module 210 decrypts and decodes the data packets received. The product of step 314 is a media file 212 containing plain content data. In step 316, the media file 212 is provided to renderer 316, which renders the content data in the media file 212. In step 318, the control flow ceases.

The approach described in FIG. 2 and FIG. 3, however, has its drawbacks. One drawback is that the encryption process of step 306 (see module 204) and the decryption process of step 314 (see module 210) must be format aware. That is, the encryption process and the decryption process must possess information identifying the media format of the media file 202. On the content mastering system 110, the encryption process of step 306 identifies the media format of the media file 202 by reading the associated metadata of media file 202. Likewise, on the client 104, the decryption process of step 314 identifies the media format of the media file 202 by reading the associated metadata of media file 202 as contained in the data packets sent to client 104. The format dependant character of the prior art process is disadvantageous because it decreases the compatibility of the system. In addition, the usability of the system is limited as new formats come into common use.

Another drawback of the prior art system is that the quality of the media file at the client 104 may decrease as data packet loss occurs. If a block cipher encryption is used in the encryption process, data packet loss during the streaming process may negatively affect the quality of the media file data received by the client 102. This is disadvantageous, as high quality streaming media is desirable. Yet another drawback of the prior art system is that repackaging of the content of the data packets is necessary when the encryption process modifies the size of the content data. This is disadvantageous as it adds another time and resource consuming process to the system. Therefore a need exists to overcome the problems with the prior art as discussed above, and particularly for a way to efficiently stream data securely.

SUMMARY OF THE INVENTION

Briefly, in accordance with the present invention, disclosed is a system, method and computer readable medium for providing secure IP-based streaming in a format independent manner. In an embodiment of the present invention, the method on a content mastering system begins with an encoded media file consisting of content data and associated metadata. First, the metadata is read from the encoded media file. Next, the encoded media file including the content data and the associated metadata is encrypted. The content data is then loaded onto a streaming server system independantly of the metadata. Then, in the streaming server system, the encoded/encrypted media file is divided into more than one data packet, streamed in accordance with one or more parameters in the metadata. Each data packet includes a portion of the encoded/encrypted media file and an offset value corresponding to a location within the encoded/encrypted media file. The data packets are then streamed to a client information processing system (i.e., the client) over a network.

In an embodiment of the present invention, the method on a client information processing system begins with receiving more than one data packet (described above) over a network. First, the client decrypts each data packet using the offset value included in each data packet. Then, the client decodes each data packet. Lastly, the client renders the content data in each data packet The described embodiments of the present invention are advantageous as they allow for format independent streaming of the media file. Before the encoded media file is encrypted and streamed, a preprocessor reads the necessary metadata from the encoded media file. This allows the server to stream the encoded/encrypted media file, in its entirety, without taking the format of the media file into account. This enhances the usability and compatibility of a secure streaming system. Another advantage of the present invention is that the encryption/decryption process does not affect the quality of the streaming data due to packet loss. This results in higher quality streaming data and increased system efficiency.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

DESCRIPTION OF THE PREFERRED EMBODIMENTS

Terminology

To more clearly point out and describe the present invention, an effort is made throughout the specification to adhere to the following term definitions as consistently as possible.

The acronym "UDP" refers to User Datagram Protocol. UDP is a combination network layer, transport layer and session layer protocol widely used on the Internet for data exchange.

The acronym "IP" refers to Internet Protocol. IP is a packet-switched network layer protocol widely used for data exchange on Ethernet networks and the Internet.

The acronym "TCP" refers to Transmission Control Protocol. TCP is a transport layer protocol built on top of IP. Typically, TCP is written as TCP/IP.

The acronym "RTP" refers to Real Time Transport Protocol. RTP is a commonly used streaming protocol that typically executes on top of UDP.

The acronym "RTCP" refers to Real Time Transport Control Protocol. RTCP is a transport layer protocol that typically executes on top of RTP.

The acronym "RTSP" refers to Real Time Streaming Protocol. RTSP is a proposed protocol for broadcasting streaming data.

The acronym "MPEG" refers to Motion Picture Experts Group. MPEG is an international organization that develops and regulates multimedia compression standards. MPEG 1 and MPEG 2 are compression algorithms widely used for compressing audio, video and multimedia files. MPEG 1 and MPEG 2 are also streaming media protocols.

The term "SEAL" refers to a particular type of stream cipher. A stream cipher is a symmetric encryption algorithm that is applied to each bit in a data stream. Conversely, a block cipher is applied to blocks of data in a data stream.

The acronym "DES" refers to Data Encryption Standard. DES is a 56-bit block cipher operating on 64 bit blocks.

The acronym "AES" refers to Advanced Encryption Standard. AES is a 128-bit cipher that was developed to take over for DES. AES can be used as a block cipher or as a stream cipher when used in counter mode.

The terms "plain" or "clear" are used to refer to data that has not been encrypted, compressed or encoded such that the data cannot be read or rendered normally. That is, plain data is data can be read or rendered by an application typically used to read or render such data. A text file is plain data as it can be read by a word processor. However, an encrypted text file is not plain data as it must be decrypted by a decryption application before it can be viewed by a word processor.

Overview

The present invention, according to a preferred embodiment, overcomes problems with the prior art by providing secure IP based streaming of data in a format independent manner. The exemplary embodiments of the present invention provide a server system wherein a media file is streamed securely to a client in a format independent manner. In addition, the exemplary embodiments of the present invention provide a client system wherein a media file is received from a server via a secure stream in a format independent manner.

As described above, FIG. 1 is a block diagram illustrating the overall system architecture of a typical prior art system for secure streaming. The overall system architecture of the present invention adheres to the system architecture of FIG.

1. As described above, a streaming server computer system 108 provides media files for streaming to clients. A content mastering system 110 creates and provides media files to the streaming server 108. Streaming server 108 streams the provided media files over a network 106 to a user 102 utilizing a client computer system 104.

In an embodiment of the present invention, the computer systems of client 104, streaming server 108, content mastering system 110 and any other computer necessary for the practice of the present invention comprise one or more Personal Computers (PCs) (e.g., IBM or compatible PC workstations running the Microsoft Windows 95198/2000/ME/CE/NT/XP operating system or the LINUX operating system, Macintosh computers running the Mac OS operating system, or equivalent), Personal Digital Assistants (PDAs), game consoles or any other computer processing devices. In another embodiment of the present invention, the computer systems of streaming server 108 and content mastering system 110 are one or more server systems (e.g., SUN Ultra workstations running the SunOS or AIX operating system or IBM RS/6000 workstations and servers running the AIX operating system).

In an embodiment of the present invention, FIG. 1 shows network 106 for connecting client 104 to streaming server 108. In one embodiment of the present invention, network 106 is a circuit switched network, such as the Public Service Telephone Network (PSTN). In another embodiment of the present invention, the network 106 is a packet switched network. The packet switched network is a wide area network (WAN), such as the global Internet, a private WAN, a local area network (LAN), a telecommunications network or any combination of the above-mentioned networks. In another embodiment of the present invention, network 106 is a wired network, a wireless network, a broadcast network or a point-to-point network. In another embodiment of the present invention, client 104 executes on the same computer system as the computer system of streaming server 108, which would negate the need for network 106.

Operation of the Invention

Figure 4:
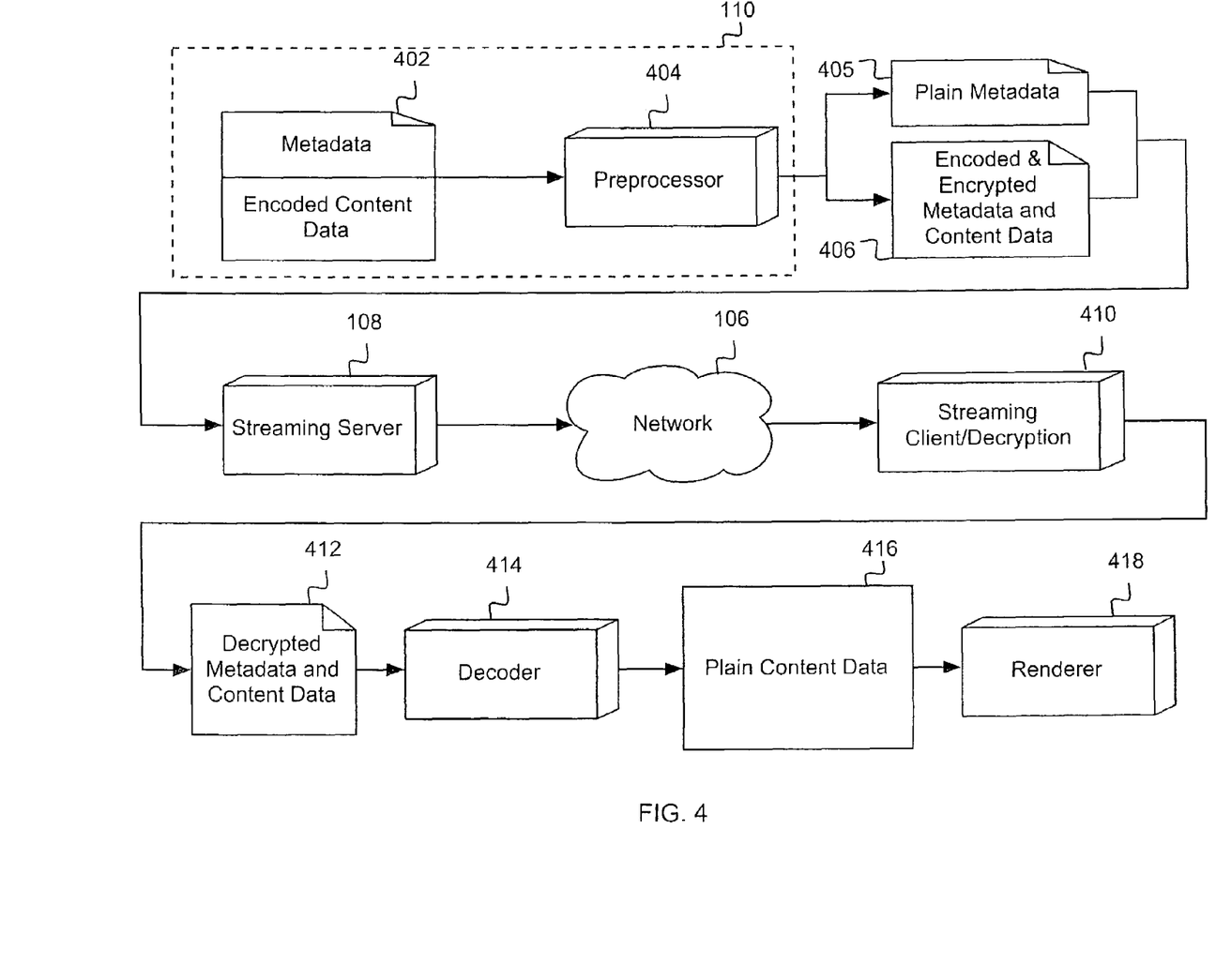
FIG. 4 is a functional diagram illustrating the overall process of one embodiment of the present invention.

FIG. 4 is a functional diagram illustrating the overall process of one embodiment of the present invention. FIG. 4 shows an encoded media file 402 comprising an encoded content data portion and an associated metadata portion. In an embodiment of the present invention, encoded media file 402 is an MPEG 2 video file, a Windows Media Player video file, a QuickTime video file, an MP3 audio file or any other media file that may be streamed. On the content mastering system 110, (see FIG. 1), a preprocessor 404 reads the encoded media file 402. In an embodiment of the present invention, preprocessor 404 is implemented in hardware, software or any combination of the two. The product of preprocessor 404 is an encoded/encrypted media file 406, wherein both the content data and the metadata are encrypted, and plain metadata 405.

Subsequently, streaming server 108 reads encoded/encrypted media file 406 and plain metadata 405. In an embodiment of the present invention, streaming server 108 is a modified version of commercially available streaming servers such as the Windows Media Streaming Server, the QuickTime Streaming Server, the Darwin Streaming Server. In this embodiment, the aforementioned commercially available streaming servers must be modified to receive encoded/encrypted media files for streaming, such as encoded/encrypted media file 406. The aforementioned commercially available streaming servers must also be modified to accept plain metadata, such as plain metadata 405, instead of reading metadata from the received media file, as in step 310 of FIG. 3.

Streaming server 108 then divides media file 406 into a finite number of data packets, which are streamed to client 104 over network 106. Each data packet includes an offset value, which is described in greater detail below. On client 104, a streaming client/decryption module 410 receives the data packets. In an embodiment of the present invention, streaming client/decryption module 410 is implemented in hardware, software or any combination of the two. The product of streaming client/decryption module 410 is a decrypted but encoded media file 412 containing decrypted content data and associated metadata.

Next, decrypted but encoded media file 412 is provided to decoder module 414. In an embodiment of the present invention, decoder module 414 can be implemented in hardware, software or any combination of the two. The product of decoder module 414 is a media file 416 containing plain content data. Media file 416 is then provided to renderer 418, which plays or reads the media file 416. In an embodiment of the present invention, renderer 418 is Microsoft Windows Media Player, QuickTime, WinAmp, iTunes, or any other computer program for playing or viewing a media file as described above.

Figure 5:
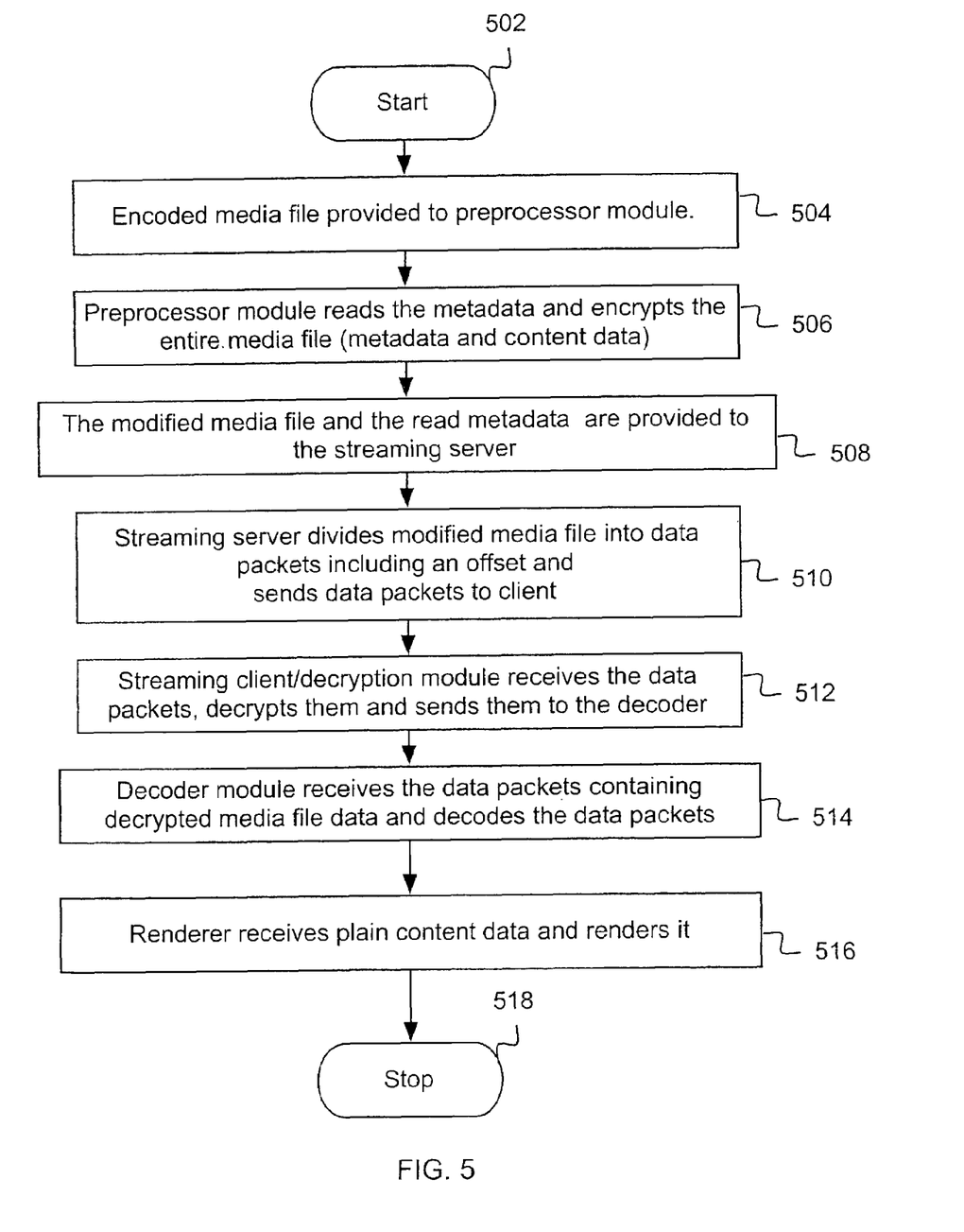
FIG. 5 is a flowchart depicting the operation and control flow of the overall process of one embodiment of the present invention.

FIG. 5 is a flowchart depicting the operation and control flow of the overall process of one embodiment of the present invention. FIG. 5 describes in more detail the functional diagram of FIG. 4. The control flow of FIG. 5 begins with step 502 and flows directly to step 504. In step 504, on a content mastering system 110, an encoded media file 402 is provided to preprocessor 404. In step 506, preprocessor 404 extracts plain metadata 405 from the media file 402 and encrypts the entire encoded media file 402.

In an embodiment of the present invention, processor 404 extracts, at a minimum, the bitrate value and media type associated with encoded media file 402. This bitrate value indicates to the streaming server 108 the rate at which the media file 402 must be streamed to the client 104. In another embodiment of the present invention, the processor 404 extracts index data describing the location of I-frames within the media file 402. The index data indicates to streaming server 108 how data in media file 402 is prepared for streaming to client 104. In another embodiment of the present invention, the processor 404 extracts the any other metadata necessary for the streaming of the media file 402 to the client 104.

In an embodiment of the present invention, preprocessor 404 uses a stream cipher encryption algorithm, such as the SEAL stream cipher or AES in counter mode, to encrypt the encoded media file 402, resulting in the encoded/encrypted media file 406. In another embodiment of the present invention, preprocessor 404 uses any stream encryption algorithm known to one of ordinary skill in the art for encrypting data.

In step 508, the encoded/encrypted media file 406 and the plain metadata 405 are provided to streaming server 108. As explained above, the plain metadata 405 provided to streaming server 108, such as the bitrate or I-frame index data, provides information associated with streaming the media file 402. In step 510, the streaming server 108, using plain metadata 405, divides the encoded/encrypted media file 406 into data packets, each including an offset value. Subsequently, streaming server 108 proceeds to stream the data packets to the client 104. In an embodiment of the present invention, streaming server 108 utilizes the RTP protocol running over UDP to stream the data packets to client 104.

In another embodiment of the present invention, streaming server 108 utilizes the RTSP or RTCP protocols, working in conjunction with the RTP protocol, to stream the data packets to client 104. In yet another embodiment of the present invention, streaming server 108 utilizes the MPEG 1 or MPEG 2 streaming protocols to stream the data packets to client 104.

In step 512, the streaming client/decryption module 410 receives the data packets sent from streaming server 108 and proceeds to decrypt each data packet using the offset values in each data packet. The offset value of each data packet indicates the relationship between a data packet and the entire, undivided media file 406. Offset values are described in greater detail below. The streaming client/decryption module 410 must use a decryption algorithm corresponding to the encryption algorithm used by preprocessor 404 in step 506. Typically, a session occurs between client 104 and another entity before step 512, wherein client 104 receives a key for use with a decryption algorithm corresponding to the encryption algorithm used in step 506.

In an embodiment of the present invention, a handshaking session occurs between client 104 and streaming server 108 before step 512, wherein client 104 receives the appropriate key for decryption of the received data packets. In another embodiment of the present invention, client 104 receives the appropriate key for decryption via communication from a third party, such as a clearinghouse, wherein client 104 is authenticated. In yet another embodiment of the present invention, client 104 determines the appropriate key for decryption dynamically using a predefined algorithm.

In step 514, the decrypted but encoded media file 412 is provided to decoder 414. Decoder 414 proceeds to decode the decrypted but encoded media file 412. The product of decoder 414 is media stream 416 containing plain content data. Decoder 414 is dependant on the format of media file 412 as decoder 414 must reconstruct frames of the media file 412 for rendering by renderer 418. In step 516, the media stream 416 is provided to renderer 418, which proceeds to render the media stream 416. In step 518, the control flow of FIG. 5 ceases.

One advantage of the system of the present invention allows for the format of the encoded media file 402 to be independent of the encryption process of step 506 and the streaming process of step 510. Because the metadata 405 needed for streaming the encoded media file 402 is provided to streaming server 108 separate from the encoded/encrypted media file 406, the streaming server 108 is not required to extract this information from the encoded/encrypted media file 406. This allows the streaming server 108 to operate independently of the format of media file 402. This benefit increases the usability and extendibility of the system. Yet another advantage of the system of the present invention is the ability of client 104 to recover easily from packet loss. Because a stream cipher is used during encryption in step 506 and each packet includes an offset value, the module 410 and decoder 414 can resynchronize at a proceeding data packet when data packet loss occurs. This benefit increases the quality of the streaming data rendered at the client 104.

Yet another advantage of the system of the present invention is the ability to reuse the encoded/encrypted media file 406 for download by client 104. Because the streaming server 108 receives a completely encoded/encrypted media file 406, the same file can be provided to the client 104 for download, in an alternative to streaming. This is beneficial for content providers that provide media files for download as well as streaming. Yet another advantage of the system of the present invention is the easy retrofitting of existing streaming systems to be compatible with the system of the present invention. Note that the decryption of step 512 occurs independent of the format of the media file and that decryption occurs at the packet level. Since the decoding of step 514 and the rendering of step 516 already exists in conventional streaming systems, a conventional streaming system of client 104 need only be retrofitted with a module for decryption, such as streaming client/decryption module 410. This is beneficial as it simplifies the adoption of the system of the present invention.

Packet Creation

Figure 6:
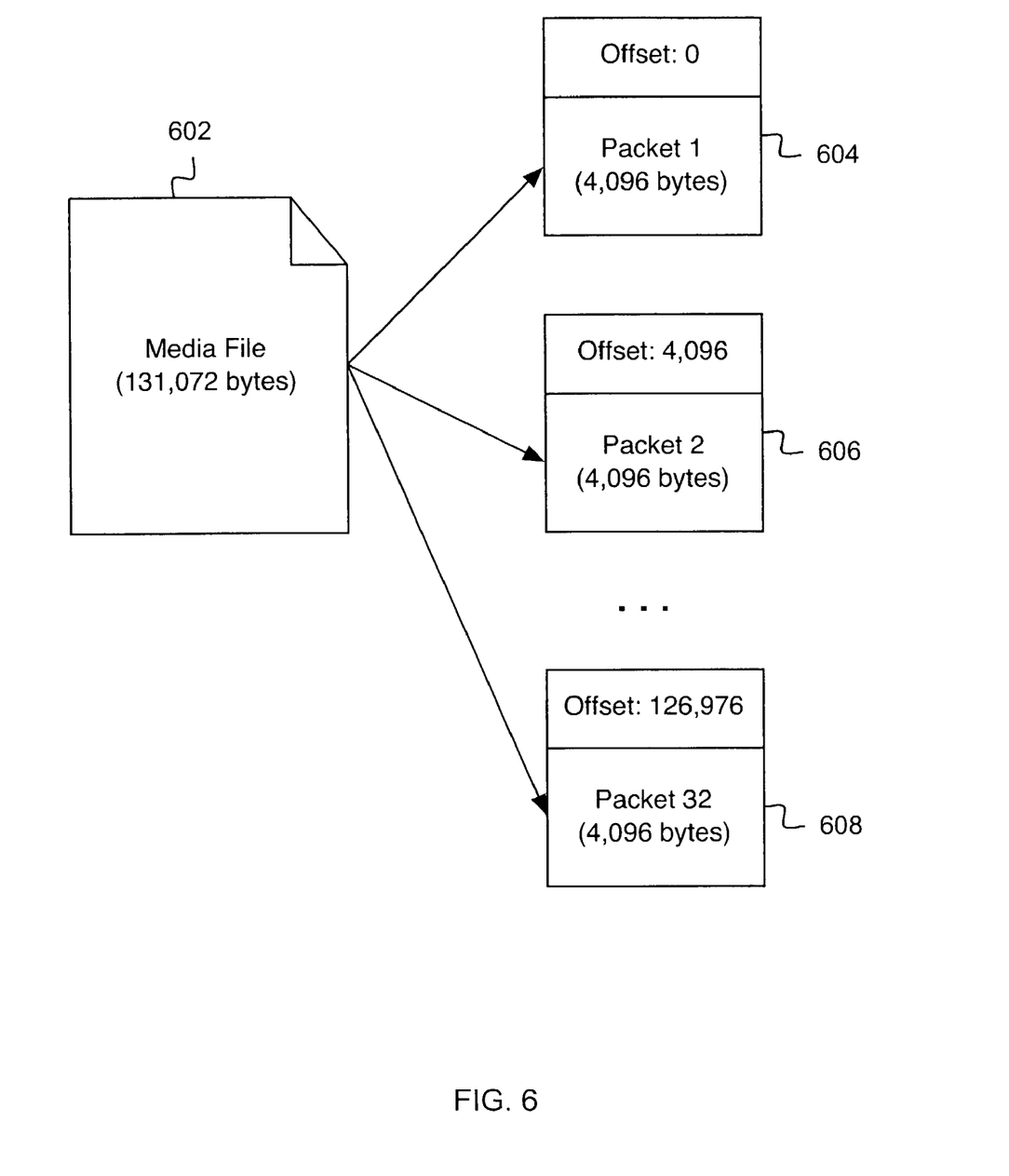
FIG. 6 is a block diagram depicting the division of a media file into a finite number of data packets, in one embodiment of the present invention.

FIG. 6 is a block diagram depicting the division of a media file into a finite number of data packets, in one embodiment of the present invention. Specifically, FIG. 6 is one embodiment of the data packet creation process of step 510 of FIG. 5. FIG. 6 shows a media file 602 consisting of a file size of 131,072 bytes. Media file 602 corresponds to encoded/encrypted media file 406 of FIG. 4. As described in FIG. 4, encoded/encrypted media file 406 is prepared for streaming to client 104 by streaming server 108. In an embodiment of the present invention, the streaming server 108 divides media file 602 into data packets of 4,096 bytes—the current standard data packet size for a 16-Megabit TokenRing network. However, in other embodiments, the size of the data packets created by streaming server 108 can be of any size appropriate for streaming to a client 104 over a network 106.

FIG. 6 shows a first data packet 604, a second data packet 606 and a thirty-second data packet 608. Since the media file 602 is of size 131,072 bytes, the streaming server 108 divides the media file 602 into thirty-two equal data packets of size 4,096 bytes. Therefore, data packet 604 contains the first 4,096 bytes of media file 602, data packet 606 contains the second 4,096 bytes of media file 602 and so forth until all 131,072 bytes of media file 602 are copied to a data packet.

FIG. 6 also shows that each data packet contains an offset value. As described above, an offset value is a number indicating a location within media file 602. More specifically, in this exemplary embodiment, the offset value in a data packet indicates the position of the first byte in that data packet within the undivided media file 602. Therefore, the offset of 0 in data packet 604 indicates that the first byte in data packet 604 is the first byte in media file 602. Further, the offset of 4,096 in data packet 606 indicates that the first byte in data packet 606 is the four thousand ninety sixth byte in media file 602. Lastly, the offset of 126,976 in data packet 608 indicates that the first byte in data packet 608 is the one hundred twenty sixth thousand nine hundred and seventy sixth byte in media file 602. In an embodiment where RTP is used by the streaming server 108 to stream data packets to the client 104, the offset value of a data packet is located either in the payload data portion of an RTP data packet or in the header portion of an RTP data packet. Upon decryption of the data packets by the client 104, as in step 512 above, the offset value of a data packet indicates how the media file 602 should be decrypted.

Exemplary Implementations

The present invention can be realized in hardware, software, or a combination of hardware and software. A system according to a preferred embodiment of the present invention can be realized in a centralized fashion in one computer system, or in a distributed fashion where different elements are spread across several interconnected computer systems.

Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Figure 7:
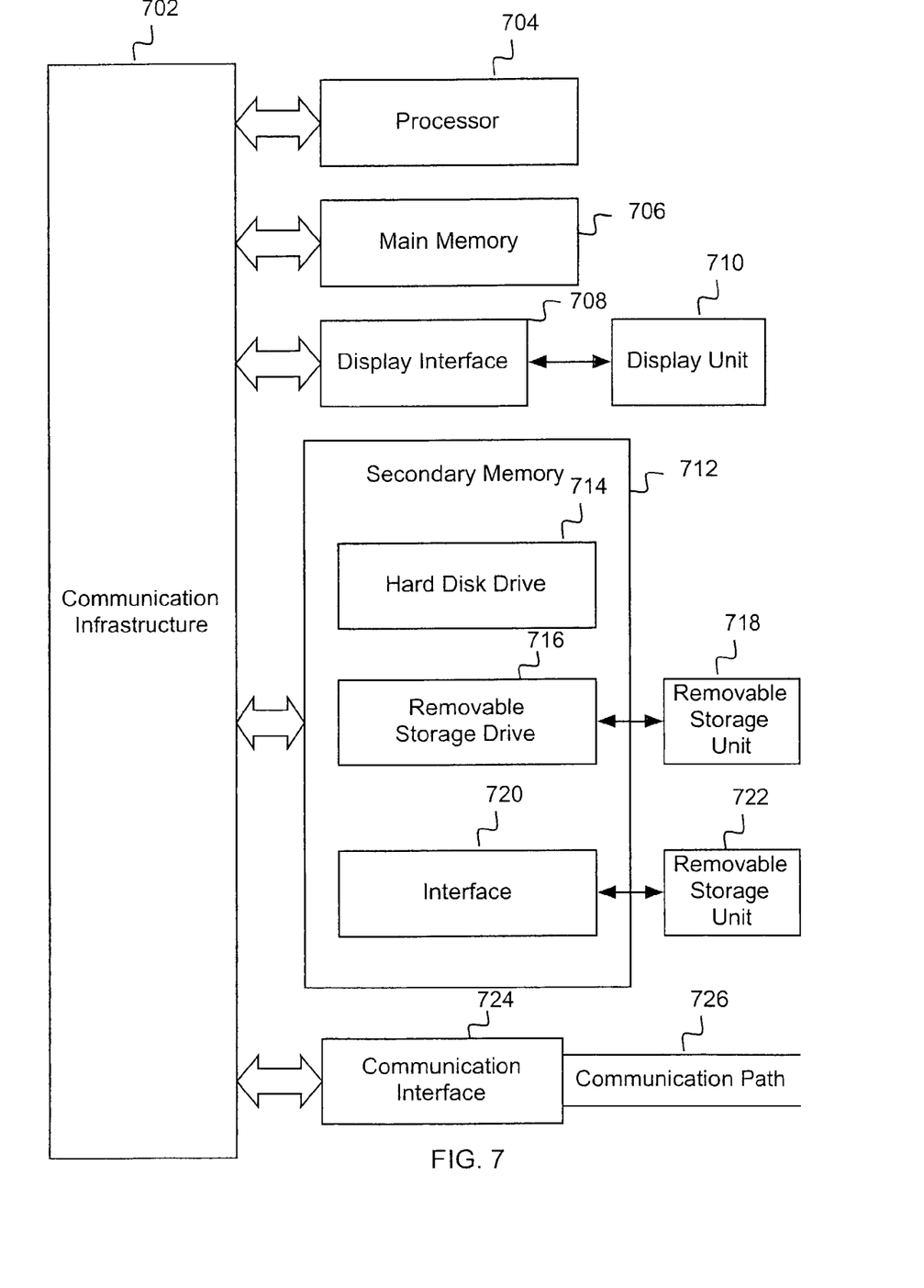
FIG. 7 is a block diagram depicting a computer system useful for implementing one embodiment of the present invention.

FIG. 7 is a block diagram depicting the hardware hierarchy of a computer system useful for implementing an embodiment of the present invention. The computer system includes one or more processors, such as processor 704. The processor 704 is connected to a communication infrastructure 702 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 708 that forwards graphics, text, and other data from the communication infrastructure 702 (or from a frame buffer not shown) for display on the display unit 710. The computer system also includes a main memory 706, preferably random access memory (RAM), and may also include a secondary memory 712. The secondary memory 712 may include, for example, a hard disk drive 714 and/or a removable storage drive 716, representing a floppy disk drive, a magnetic tape drive, an optical disk drive, etc. The removable storage drive 716 reads from and/or writes to a removable storage unit 718 in a manner well known to those having ordinary skill in the art. Removable storage unit 718, represents a floppy disk, magnetic tape, optical disk, etc. which is read by and written to by removable storage drive 716. As will be appreciated, the removable storage unit 718 includes a computer usable storage medium having stored therein computer software and/or data.

In alternative embodiments, the secondary memory 712 may include other similar means for allowing computer programs or other instructions to be loaded into the computer system. Such means may include, for example, a removable storage unit 722 and an interface 720. Examples of such may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to the computer system.

The computer system may also include a communications interface 724. Communications interface 724 allows software and data to be transferred between the computer system and external devices. Examples of communications interface 724 may include a modem, a network interface (such as an Ethernet card), a communications port, a PCM-CIA slot and card, etc. Software and data transferred via communications interface 724 are in the form of signals which may be, for example, electronic, electromagnetic, optical, or other signals capable of being received by communications interface 724. These signals are provided to communications interface 724 via a communications path (i.e., channel) 726. This channel 726 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 706 and secondary memory 712, removable storage drive 716, a hard disk installed in hard disk drive 714, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information.

Computer programs (also called computer control logic) are stored in main memory 706 and/or secondary memory 712. Computer programs may also be received via communications interface 724. Such computer programs, when executed, enable the computer system to perform the features of the present invention as discussed herein. In particular, the computer programs, when executed, enable the processor 704 to perform the features of the computer system. Accordingly, such computer programs represent controllers of the computer system.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A method on a server information processing system for providing streaming data, comprising:

receiving a media file including content data and associated metadata, wherein the media file has been encoded and encrypted, wherein the media file is a single media file that is available for both downloading and streaming, and wherein the associated metadata, at least prior to the media file being encrypted, includes streaming parameters for streaming data packets in addition to the single media file being available for downloading and non-streaming parameters;

receiving non-encrypted metadata associated with the media file, wherein the non-encrypted metadata is received separately and distinctly from the media file, and wherein the non-encrypted metadata is a portion of the associated metadata and is extracted from the media file prior to the media file and the associated metadata being encrypted, wherein the non-encrypted metadata includes one or more of the streaming parameters for streaming data packets, and wherein the media file is encrypted prior to receiving the non-encrypted metadata;

dividing the media file which has been encoded and encrypted into more than one data packet, wherein each data packet includes a portion of the media file and an offset value corresponding to a location within the media file, and wherein the dividing is independent of a format for the media file; and streaming the more than one data packets over a network to a client as directed by the one or more parameters in the non-encrypted metadata associated with the media file, wherein the streaming is independent of a format for the media file.

2. The method of claim 1, wherein the first receiving step comprises:

receiving an encoded media file including content data and associated metadata, wherein the media file has been encrypted using a stream cipher.

3. The method of claim 2, wherein the first receiving step further comprises:

wherein the media file has been encoded using a MPEG 2 compression algorithm.

4. The method of claim 3, wherein the second receiving step comprises:

receiving non-encrypted metadata associated with the media file, wherein the non-encrypted metadata includes a bitrate value, wherein only a remaining portion of the associated metadata excluding the non-encrypted metadata is received by the client.

5. The method of claim 4, wherein the streaming step comprises:

streaming the more than one data packets over a network to a client using a RTP protocol.

6. A method on a client information processing system for receiving streaming data, comprising:

requesting a media file including content data and associated metadata, wherein the media file is a single media file that is available for both downloading and streaming;

receiving one or more data packets associated with the media file which has been requested, wherein each data packet includes a portion of the media file which has been encrypted and encoded, wherein at least one data packet includes at least a portion of the media file, wherein the portion of the media file is associated metadata that has also been encrypted and only includes non-streaming parameters, and wherein each data packet includes an offset value corresponding to a location within the media file and wherein the data packets are streamed independently of a format for the media file;

decrypting each data packet using the offset values in each data packet;

decoding each data packet; and rendering the content data in each data packet.

7. The method of claim 6, wherein the decrypting step comprises:

decrypting each data packet using the offset values in each data packet, wherein a stream decipher algorithm is used for the decrypting.

8. The method of claim 7, wherein the decoding step comprises:

decoding each data packet, wherein a MPEG 2 decoding algorithm is used for decoding.

9. A computer readable medium including computer instructions on a server information processing system for providing streaming data, the computer instructions comprising:

receiving a media file including content data and associated metadata, wherein the media file has been encoded and encrypted, wherein the media file is a single media file that is available for both downloading and streaming, and wherein the associated metadata, at least prior to the media file being encrypted, includes streaming parameters for streaming data packets in addition to the single media file being available for downloading and non-streaming parameters;

receiving non-encrypted metadata associated with the media file, wherein the non-encrypted metadata is received separately and distinctly from the media file, and wherein the non-encrypted metadata is a portion of the associated metadata and is extracted from the media file prior to the media file and the associated metadata being encrypted, wherein the non-encrypted metadata includes one or more of the streaming parameters for streaming data packets, and wherein the media file is encrypted prior to receiving the non-encrypted metadata;

dividing the media file which has been encoded and encrypted into more than one data packet, wherein each data packet includes a portion of the media file and an offset value corresponding to a location within the media file, and wherein the dividing is independent of a format for the media file; and streaming the more than one data packets over a network to a client as directed by the one or more parameters in the non-encrypted metadata associated with the media file, wherein the streaming is independent of a format for the media file.

10. The computer readable medium of claim 9, wherein the computer instructions for receiving comprise:

receiving an encoded media file including content data and associated metadata, wherein the media file has been encrypted using a stream cipher.

11. The computer readable medium of claim 10, wherein the computer instructions for receiving further comprise:

wherein the media file has been encoded using a MPEG 2 compression algorithm.

12. The computer readable medium of claim 11, wherein the computer instructions for receiving comprise:

receiving non-encrypted metadata associated with the media file, wherein the non-encrypted metadata includes a bitrate value.

13. The computer readable medium of claim 12, wherein the instructions for streaming comprise:
streaming the more than one data packets over a network to a client using a RTP protocol.

14. A computer readable medium including computer instructions on a client information processing system for receiving streaming data, the computer instructions comprising:
requesting a media file including content data and associated metadata, wherein the media file is a single media file that is available for both downloading and streaming;
receiving one or more data packets associated with the media file which has been requested, wherein each data packet includes a portion of the media file which has been encrypted and encoded, wherein at least one data packet includes at least a portion of the media file, wherein the portion of the media file is associated metadata that has also been encrypted and only includes non-streaming parameters, and wherein each data packet includes an offset value corresponding to a location within the media file and wherein the data packets are streamed independently of a format for the media file;
decrypting each data packet using the offset values in each data packet;
decoding each data packet; and
rendering the content data in each data packet.

15. The computer readable medium of claim 14, wherein the instructions for decrypting comprise:
decrypting each data packet using the offset values in each data packet, wherein a stream decipher algorithm is used for the decrypting.

16. The computer readable medium of claim 15, wherein the instructions for decoding comprise:
decoding each data packet, wherein a MPEG 2 decoding algorithm is used for decoding.

17. A system for providing streaming data, comprising:
a content mastering server, the content mastering server comprising:
an encoded media file including content data and associated metadata, wherein the media file is a single media file that is available for both downloading and streaming, wherein the associated metadata, at least prior to the media file being encrypted, includes streaming parameters for streaming data packets in addition to the single media file being available for downloading and non-streaming parameters;
an encrypter for encrypting the media file including the content data and the associated metadata;
a metadata extractor for extracting a set of metadata from the associated metadata, wherein the set of metadata is a portion of the associated metadata, the extracting occurring prior to the encrypter encrypting the content data and the associated metadata, the set of metadata being a set of non-encrypted metadata associated with the media file, and wherein the non-encrypted metadata includes one or more parameters for streaming data packets; and
a streaming server for dividing the media file which has been encoded and encrypted into more than one data packet, wherein each data packet includes a portion of the media file and an offset value corresponding to a location within the media file, and streaming the data packets to a client over a network as directed by the one or more parameters in the set of non-encrypted metadata, wherein the dividing and streaming are independent of a format for the media file.

18. The system of claim 17, wherein the encrypter comprises:
an encrypter for encrypting the media file including the content data and the associated metadata, wherein a stream cipher is used for encrypting.

19. A client information processing system for receiving streaming data, comprising:
a request for a media file including content data and associated metadata, wherein the media file is a single media file that is available for both downloading and streaming;
one or more data packets, wherein each data packet includes a portion of the media file, which has been encoded and encrypted, wherein at least one data packet includes at least a portion of the media file, wherein the portion of the media file is associated metadata that has also been encrypted and only includes non-streaming parameters, and, an offset value corresponding to a location within the media file and wherein the data packets are streamed independently of a format for the media file;
a decrypter for decrypting each data packet using the offset values in each data packet;
a decoder for decoding each data packet; and
a renderer for rendering the content data in each data packet.

20. The system of claim 19, wherein the decrypter comprises:
a decrypter for decrypting each data packet using the offset values in each data packet, wherein a stream decipher is used for decrypting.

* * * * *